United States Patent Office 3,506,682
Patented Apr. 14, 1970

3,506,682
PHENYLCYCLOPROPYL CARBINOLS AND PROCESS FOR THEIR PREPARATION
John H. Fried, Palo Alto, Calif., assignor to Syntex Corporation, Panama, Panama, a corporation of Panama
No Drawing. Filed Aug. 25, 1966, Ser. No. 574,920
Int. Cl. C07d 27/00
U.S. Cl. 260—326.5                                11 Claims

ABSTRACT OF THE DISCLOSURE

This discloses as new compounds, 2,4-diphenylspiro[2.5]octan-4-ols, 2-phenyl-4-ethynylspiro[2.5]octan-4-ols, 2,4-diphenylspiro[2.4]heptan-4-ols, 2-phenyl-4-ethynylspiro[2.4]heptan-4-ols, 1,2-methylene-1,3,3-triphenylpropan-3-ols, and 1,2-methylene-1,3-diphenyl-3-ethynylpropan-3-ols and derivatives thereof wherein the phenyl moieties are optionally substituted with (lower)-alkyl, (lower)alkoxy, di(lower)alkylamino(lower)alkoxy or cycloalkyleneamino(lower)alkoxy and wherein the ethynyl moiety is optionally substituted with chloro or methyl. These compounds are useful in the control of fertility, in reversing the effects of estrogen in animals, and in lowering serum cholesterol levels. Also taught are methods for the preparation of these compounds and the corresponding intermediate phenyl (or substituted phenyl) allylic carbinols useful in these preparations.

---

This invention relates to novel organic compounds and to processes for their preparation.

More specifically, the present invention pertains to cyclopropyl carbinols, in particular to 2-phenylcyclopropyl carbinols, and to methods for preparing the same.

The compounds prepared in accordance with the present invention may be represented by the following structural formula:

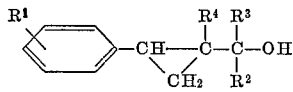

in which $R^1$ is hydrogen, (lower)alkyl, (lower)alkoxy, di-(lower)alkylamino(lower)alkoxy or cycloalkyleneamino(lower)alkoxy:

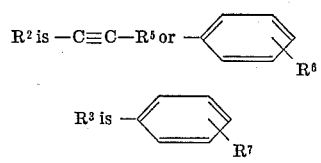

$R^4$ is hydrogen;
$R^3$ and $R^4$ taken together are α, δ-butylene; or α, γ-propylene $R^5$ is hydrogen, chloro or methyl; and
each of $R^6$ and $R^7$, independent of the other, is hydrogen, (lower)alkyl, (lower)alkoxy, di-(lower)alkylamino-(lower)alkoxy or cycloalkyleneamino(lower)alkoxy.

In the context of the present invention, the term "alkyl," and derivations thereof such as "alkoxy," "alkylene," and the like, refer to a branched or straight chain hydrocarbon groups. When qualified by the term "(lower)," such groups will contain up to six carbons. Typical of such (lower)alkyl groups are thus methyl, ethyl, propyl, i-propyl, butyl, hexyl and the like, and of such (lower)alkoxy groups are methoxy, ethoxy, butoxy and the like. The term "cycloalkyleneamino" refers to a 5 or 6 membered saturated, nitrogen-containing ring such as the N-pyrrolidino and N-piperidino groups.

The compounds of the present invention are useful in the control of fertility and in reversing the effects of estrogen in animals, thus for instance controlling bulling and nymphomania in cattle. Some of these compounds also demonstrate the ability to lower serum cholesterol levels. Generally, these compounds are effective at a daily dosage of from about 0.1 mg. to about 10 mg. per kilogram of body weight and may be administered in conventional pharmaceutical forms, such as tablets, capsules, solutions, suspensions and the like, appropriate for the particular route of administration. In those cases in which one or more of $R^1$, $R^6$ and $R^7$ is an amino function, the compounds are often more suitably administered in the form of a nontoxic pharmaceutically acceptable acid addition salt. For this purpose any of the acids conventionally used in this regard, such as hydrochloric, sulfuric, citric, phosphoric, pamoic, acetic and the like, may be employed. The pharmacological properties of such salts are however a manifestation of the cationic form of these compounds of the present invention and not of the salt per se.

The compounds of the present invention are prepared from readily available starting materials, or starting materials easily prepared by conventional methods, through a three stage synthesis which may be represented as follows:

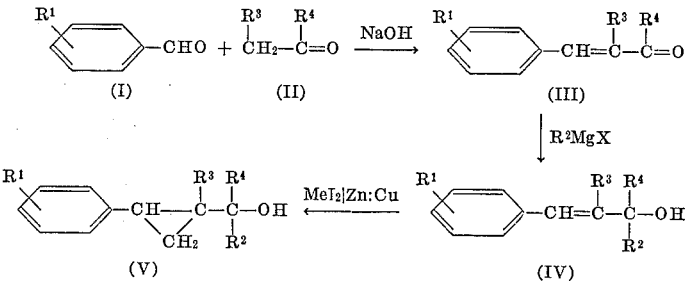

In the foregoing $R^1$, $R^2$, and $R^3$ and $R^4$ are as previously defined. According to the process of the present invention, benzaldehyde or a substituted benzaldehyde (I) and a ketone of Formula II are subjected to a Claisen-Schmidt condensation to yield the α,β-unsaturated ketone (III). This is readily achieved by agitating the two reactants in the presence of aqueous sodium hydroxide, generally at about room temperature and optionally in the presence of an alkanol cosolvent. The ketone employed in this reaction may be acetophenone, a substituted acetophenone, cyclohexanone or cyclopentanone.

The α,β-unsaturated ketone (III) thus obtained is then alkylated, generally through the use of a suitable Grignard reagent such as an alkynylmagnesium bromide, phenylmagnesium chloride, or the like, preferably in tetrahydrofuran. Alternatively, this alkylation can be effected with an alkali metal alkyne such as lithium acetylide. The resultant allylic carbinols (IV) are not only valuable intermediates for the preparation of compounds of the present invention but also exhibit the same types of activities as do the phenylcyclopropyl carbinols themselves.

After isolation, the allylic carbinol (IV) is subjected to the action of the reaction product of methylene iodide and a zinc:copper couple in accordance with the conventional Simmons-Smith reaction conditions. Thus obtained after isolation and purification, is the phenylcyclopropyl carbinol of Formula V.

In those instances in which cyclohexanone or cyclopentanone is employed as the ketone in the initial condensations, the final compounds will have the structure represented by Formula VIA and VIB respectively, whereas when an acetophenone is employed as the ketone, the final product will have a structure represented by Formula VII:

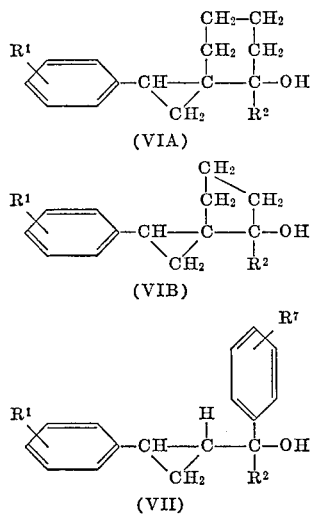

The compounds of Formula VIA and VIB are herein named as derivatives of spiro[2.5]octan-4-ol, and spiro[2.4]heptan-4-ol, respectively, whereas those of Formula VII are named as derivatives of 1,2-methylenepropan-3-ol.

Particularly preferred compounds are those of Formulas VIA, VIB, and VII wherein $R^1$ is p-methoxy or p-[β-(N-pyrrolidinoethoxy)], $R^2$ is ethynyl, p-methoxyphenyl or p-[β-(N-pyrrolidinoethoxy)]phenyl and $R^7$ is hydrogen or p-methoxy.

The presence of "asymmetric" carbon atoms in the compounds of present invention permits the existence of optical isomers and all such forms are including within the scope of the present invention. With regard to the hydroxy substituent on the carbinol carbon atom with reference to the cyclopropane ring, the configuration is cis.

The following examples will serve to further typify the nature of the present invention but since these are presented solely for the purpose of illustration, they should not be construed as a limitation on the scope of this invention.

EXAMPLE 1

(A) To a stirred solution of 100 g. of sodium hydroxide in one liter of water and 800 ml. of methanol is added, at room temperature, one-half of the total mixture of 219 g. of 4-(N-pyrrolidinoethoxy)benzaldehyde and 100 g. of cyclohexanone. The mixture is stirred vigorously for 15 minutes and the remaining one-half of the mixture is then added. Vigorous stirring is continued for an additional hour and the mixture is then rendered acidic with dilute hydrochloric acid. The aqueous phase is separated, rendered alkaline with aqueous sodium bicarbonate and extracted with benzene. The combined organic layer and benzene extracts are washed well with water, dried and concentrated to yield 2-[4-(N-pyrrolidinoethoxy)benzylidene]cyclohexanone which may be further purified through vacuum distillation or recrystallization from ethyl acetate.

(B) A stream of acetylene is bubbled through a suspension of 1.2 moles of ethylmagnesium bromide in freshly distilled tetrahydrofuran for two hours. At the end of this time, the mixture is flushed with dry nitrogen and then treated under nitrogen in a dropwise fashion with 247 g. of 2-[4-(N-pyrrolidinoethoxy)-benzylidene]cyclohexanone dissolved in 500 ml. of dry tetrahydrofuran. When the addition is complete, the mixture is refluxed for one hour, cooled and cautiously treated with water. The phases are separated and the aqueous layer washed with benzene. The combined organic layer and benzene washings are washed with water, dried and concentrated by evaporation to yield 1 - ethynyl - 2 - [4-(N-pyrrolidinoethoxy)benzylidene]cyclohexan - 1 - ol which may be further purified through recrystallization from methanol.

(C) A mixture of 70 g. of methylene iodide and 30 g. of zinc:copper couple in 150 ml. of anhydrous ether is heated under nitrogen at reflux for three hours. At the end of the time, 20 g. of 2-[4-(N-pyrrolidinoethoxy)benzylidene]cyclohexan-1-ol is added to the cooled solution. This mixture is allowed to stand at room temperature for two hours and then poured into 2 liters of 2% aqueous sodium bicarbonate and extracted twice with 100 ml. portions of ethyl ether. These extracted are dried over sodium sulfate and evaporated under reduced pressure. The residue is held at 0.01 mm. to remove any unreacted methylene iodide and then recrystallized from hexane to yield 4 - ethynyl - 2 - [4 - (N - pyrrolidinoethoxy)phenyl]-spiro[2.5]octan-4-ol.

If cyclopentanone is substituted for cyclohexanone in the procedure of Part (B) of this example, there is initially obtained 1 - ethynyl - 2 - [4 - (N - pyrrolidinoethoxy)benzylidene]cyclopentan-1-ol which when treated in accordance with Part (C) yields 4-ethynyl-2-[4-(N-pyrrolidinoethoxy)phenyl]spiro[2.4]heptan-4-ol.

EXAMPLE 2

Part (A) of Example 1 is repeated, employing 136 g. of p-methoxybenzaldehyde in place of 4-(N-pyrrolidinoethoxy)benzaldehyde, to yield 2-(4-methoxybenzylidene)-cyclohexanone.

A solution of 85 g. of 1,2-dichloroethylene in 500 ml. of anhydrous ether is added in a dropwise fashion, under nitrogen and at 0° C., to a stirred solution of 150 ml. of 1.4 N methyl lithium in anhydrous ether. After stirring for an additional 90 minutes at room temperature, a solution of 5 g. of 2-(4-methoxybenzylidene)cyclohexanone in 200 ml. of anhydrous ether is added in a dropwise fashion with stirring. Stirring at room temperature is continued for 18 hours and the mixture is then poured into ice water and extracted with ether. These extracts are washed with water to neutrality, dried over sodium sulfate and evaporated to yield 1-chloroethynyl-2-(4-methoxybenzylidene)cyclohexan-1-ol.

Upon subjecting this compound to the action of the reaction product of methylene iodide and zinc:copper couple in the fashion described in Part (C) of Example 1, there is obtained 4-chloroethynyl-2-(4-methoxyphenyl)-spiro[2.5]octan-4-ol.

EXAMPLE 3

The 20 ml. of a solution of 284 g. of p-methoxychloro benzene, and 450 ml. of tetrahydrofuran are added under nitrogen, 48.6 g. of magnesium turnings, 2 ml. of ethyl bromide and a small iodine crystal. Upon initiation of reaction, the remainder of the p-methoxychlorobenzene tetrahydrofuran solution is added in a dropwise fashion, maintaining the reaction mixture at reflux temperatures. When the magnesium turnings are consumed, a solution of 618 g. of 2-[4-(N-pyrrolidinoethoxy)benzylidene]cyclohexanone in tetrahydrofuran is added in a dropwise fashion, maintaining a nitrogen atmosphere. Upon completion of the addition, the mixture is refluxed for one hour, cooled, and cautiously treated with a saturated aqueous solution of ammonium chloride. The layers are separated and the aqueous layer is rendered alkaline and extracted with benzene. These extracts are combined with the organic layer and this combined mixture is washed with water, dried over sodium sulfate and evaporated to yield 1 - (4 - methoxyphenyl) - 2 - [4 - (N - pyrrolidinoethoxy)benzylidene]cyclohexan-1-ol which may be further purified through recrystallization from methanol.

Upon subjecting this compound to the procedure of Part (C) of Example 1, there is obtained 4-(4-methoxyphenyl) - 2 - [4 - (N - pyrrolidinoethoxy)phenyl]spiro-[2.5]octan-4-ol.

EXAMPLE 4 p-Methoxybenzaldehyde and 4-(N-pyrrolidinoethoxy)-acetophenone are allowed to react in the presence of sodium hydroxide in the manner described in Part (A) of Example 1 to yield, upon completion of the procedure therein described, 1 - (4 - methoxyphenyl) - 3 - [4 - (N-pyrrolidinoethoxy)phenyl]propen-3-one. Upon treatment of this compound with phenyl magnesium chloride or phenyl-magnesium bromide as described in Example 3, there is obtained 1-(4-methoxyphenyl)-3-phenyl-3-[4-(N-pyrrolidinoethoxy)phenyl]propen-3-ol. This compound is then treated with the reaction product of methylene iodide and zinc:copper couple as described in Part (C) of Example 1 to yield 1,2-methylene-1-(4-methoxyphenyl)-3-phenyl-3-[4-(N-pyrrolidinoethoxy)phenyl]propan-3-ol.

By employing ethynylmagnesium bromide in place of phenylmagnesium chloride, there is obtained 1,2-methylene - 1 - (4 - methoxyphenyl) - 3 - ethynyl - 3 - [4 - (N-pyrrolidinoethoxy)phenyl]propan-3-ol.

EXAMPLE 5

In a similar fashion as described above, by condensing the following aldehydes and ketones, treating the resulting unsaturated ketones with the indicated Grignard reagents, and subjecting the thus-produced unsaturated carbinols with the reaction product of methylene iodide and zinc:copper couple, the following cyclopropyl carbinols are respectively obtained.

(I) *Aldehyde:*
  (a) benzaldehyde
  (b) 3-methoxybenzaldehyde
  (c) 4-methoxybenzaldehyde
  (d) 4-methoxybenzaldehyde
  (e) 4-methoxybenzaldehyde
  (f) 4-methoxybenzaldehyde (II) *Ketone:*
  (a) cyclohexanone
  (b) cyclohexanone
  (c) 4-methoxyacetophenone
  (d) 3-methylacetophenone
  (e) cyclopentanone
  (f) cyclopentanone (III) *Grignard reagent:*
  (a) 4-methoxyphenylmagnesium bromide
  (b) 3-methylphenylmagnesium bromide
  (c) prop-1-enylmagnesium bromide
  (d) 4 - (N,N - diethylaminoethoxy)phenylmagnesium bromide
  (e) 4-methoxyphenylmagnesium bromide
  (f) lithium acetylide (IV) *Product:*
  (a) 4 - (4 - methoxyphenyl) - 2 - phenylspiro[2.5]-octan-4-ol
  (b) 4 - (3 - methylphenyl) - 2 - (3 - methoxyphenyl)-spiro[2.5]octan-4-ol
  (c) 1,2 - methylene - 1,3 - bis(4 - methoxyphenyl)-3-(prop-1-ynyl)propan-3-ol
  (d) 1,2 - methylene - 1 - (4 - methoxyphenyl) - 3-(3 - methylphenyl) - 3 - [4 - (N,N - diethylaminoethoxy)phenyl]propan-3-ol
  (e) 2,4 - bis(methoxyphenyl)spiro[2.4]cycloheptan-4-ol
  (f) 2 - (4 - methoxyphenyl) - 4 - ethynylspiro[2.4]-cycloheptan-4-ol

What is claimed is:

1. The compound of formula:

$$\text{R}^1\text{-C}_6\text{H}_4\text{-CH}-\overset{\text{R}^4}{\underset{\text{CH}_2}{\text{C}}}-\overset{\text{R}^3}{\underset{\text{R}^2}{\text{C}}}-\text{OH}$$

wherein $R^1$ is hydrogen, (lower)alkyl, (lower)alkoxy, di-(lower)alkylamino(lower)alkoxy, or cycloalkyleneamino(lower)alkoxy;

$$R^2 \text{ is} - C \equiv CR^5 \text{ or } -C_6H_4-R^6$$

$$R^3 \text{ is} - C_6H_4-R^7$$

$R^4$ is hydrogen;
$R^3$ and $R^4$ taken together are $\alpha,\delta$-butylene or $\alpha,\gamma$-propylene;
$R^5$ is hydrogen, chloro or methyl, and;
each of $R^6$ and $R^7$ is hydrogen, (lower)alkyl, (lower)-alkoxy, di(lower)alkylamino(lower)alkoxy or cycloalkyleneamino(lower)alkoxy.

2. The compound of the formula:

$$\text{R}^1\text{-C}_6\text{H}_4\text{-CH}-\overset{\overset{\text{CH}_2-\text{CH}_2}{|\quad\quad|}}{\underset{\text{CH}_2}{\overset{\text{CH}_2\quad\text{CH}_2}{\text{C}}}}-\overset{}{\underset{\text{C}\equiv\text{CR}^5}{\text{C}}}-\text{OH}$$

wherein $R^1$ is hydrogen, (lower)alkyl, (lower)alkoxy, di-(lower)alkylamino(lower)alkoxy, or cycloalkyleneamino(lower)alkoxy and
$R^5$ is hydrogen, chloro or methyl.

3. The compound according to claim 2 wherein $R^1$ is p-methoxy, p-[di(lower)alkylaminoethoxy] or p-(N-pyrrolidinoethoxy) and $R^5$ is hydrogen or chloro.

4. The compound of the formula:

$$\text{R}^1\text{-C}_6\text{H}_4\text{-CH}-\overset{\overset{\text{CH}_2-\text{CH}_2}{|\quad\quad|}}{\underset{\text{CH}_2}{\overset{\text{CH}_2\quad\text{CH}_2}{\text{C}}}}-\overset{}{\underset{\text{C}_6\text{H}_4-\text{R}^6}{\text{C}}}-\text{OH}$$

wherein each of $R^1$ and $R^6$ is hydrogen, (lower)alkyl, (lower)alkoxy, di(lower)alkylamino(lower)alkoxy or cycloalkyleneamino(lower)alkoxy.

5. The compound according to claim 4 wherein each of $R^1$ and $R^6$ is p-methoxy, p-[di-(lower)alkylaminoethoxy] or p-(N-pyrrolidinoethoxy).

6. The compound of the formula:

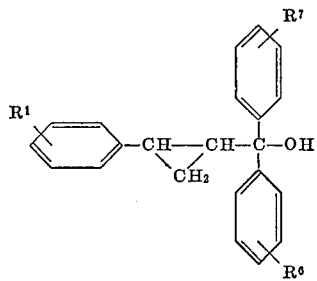

wherein each of $R^1$, $R^6$ and $R^7$ is hydrogen, (lower)alkyl, (lower)alkoxy, di(lower)alkylamino(lower)alkoxy or cycloalkyleneamino(lower)alkoxy.

7. The compound of the formula:

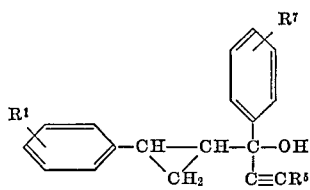

wherein each of $R^1$ and $R^7$ is hydrogen, (lower)alkyl, (lower)alkoxy, di(lower)alkylamino(lower)alkoxy or cycloalkyleneamino(lower)alkoxy; and $R^5$ is hydrogen, chloro or methyl.

8. 4 - ethynyl - 2 - [4 - (N-pyrrolidinoethoxy)phenyl]-spiro[2.5]octan-4-ol.

9. 4-(4-methoxyphenyl)-2-[4-(N - pyrrolidinoethoxy)-phenyl]spiro[2.5]octan-4-ol.

10. 1,2 - methylene - 1 - (4 - methoxyphenyl) - 3-phenyl-3-[4-N-pyrrolidinoethoxy)phenyl]propan-3-ol.

11. 1,2 - methylene - 1 - (4 - methoxyphenyl)-3-ethynyl-3-[4-(N-pyrrolidinoethoxy)phenyl]propan-3-ol.

References Cited

Biro et al.: Helv. Chim. Acta., vol. 37, pages 2230 to 2239 (1954).

Goffinet: Comptes Rendus, vol. 239, pages 1815 to 1817 (1954).

Darby et al.: J. Org. Chem., vol. 22 pages 1353 to 1354 (1957).

Chemical Abstracts, vol. 57, cols. 16508 to 16509 (1962).

Ziegler et al.: Ber. Deut. Chem., vol. 55, pages 2257 to 2259 and 2271 to 2272 (1922).

Luttrinhaus: Ber. Deut. Chem., vol. 67, pages 1602 to 1603 (1934).

JOHN D. RANDOLPH, Primary Examiner

U.S. Cl. X.R.

260—240, 294.7, 559, 570.7, 590, 612, 613, 618, 999